(12) United States Patent
Crane et al.

(10) Patent No.: US 9,738,262 B2
(45) Date of Patent: *Aug. 22, 2017

(54) WINDSHIELD WIPER MODULE

(71) Applicant: Magna International Inc., Aurora (CA)

(72) Inventors: Michael William Crane, Oakland Township, MI (US); Brian Christopher Sansoterra, Clawson, MI (US); Norman Guschewski, Rochester, MI (US)

(73) Assignee: MAGNA INTERNATIONAL INC., Aurora, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 14/606,302

(22) Filed: Jan. 27, 2015

(65) Prior Publication Data

US 2015/0258969 A1  Sep. 17, 2015

Related U.S. Application Data

(63) Continuation of application No. 14/232,966, filed as application No. PCT/US2012/047612 on Jul. 20, 2012, now Pat. No. 8,973,968.
(Continued)

(51) Int. Cl.
*B60S 1/52* (2006.01)
*B60S 1/58* (2006.01)
(Continued)

(52) U.S. Cl.
CPC ............... *B60S 1/583* (2013.01); *B60Q 1/00* (2013.01); *B60Q 1/2684* (2013.01); *B60Q 1/302* (2013.01);
(Continued)

(58) Field of Classification Search
CPC .......... B60S 1/04; B60S 1/0433; B60S 1/582; B60S 1/583; B60Q 1/0017; B60Q 1/2661;
(Continued)

(56) References Cited

U.S. PATENT DOCUMENTS 1,518,058 A  12/1924  Folberth et al.
1,886,812 A  11/1932  Hueber et al.
(Continued)

FOREIGN PATENT DOCUMENTS

DE  32 06 173  8/1983
DE  32 26 578  1/1984
(Continued)

OTHER PUBLICATIONS

International Search Report for International Application No. PCT/US2012/047612, Filed Jul. 20, 2012.

*Primary Examiner* — H Gutman
(74) *Attorney, Agent, or Firm* — Warn Partners, P.C.

(57) ABSTRACT

A wiper module assembly for a vehicle liftgate having an inner panel with a spoiler formed as a one-piece part of the inner panel. An outer panel of the liftgate is connected to the inner panel to form an exterior surface of the liftgate. A cavity is formed in part of the spoiler and receives a carrier forming a removable module connected to the cavity of the vehicle liftgate. The carrier includes a wiper, motor and drive assembly for operating a wiper for a window on the liftgate.

9 Claims, 9 Drawing Sheets

Related U.S. Application Data

(60) Provisional application No. 61/572,831, filed on Jul. 22, 2011.

(51) Int. Cl.

| | | |
|---|---|---|
| *B60S 1/04* | (2006.01) | |
| *B60Q 1/00* | (2006.01) | |
| *B60Q 1/26* | (2006.01) | |
| *B60Q 1/30* | (2006.01) | |
| *B62D 35/00* | (2006.01) | |
| *B60S 1/08* | (2006.01) | |

(52) U.S. Cl.
CPC ............... *B60S 1/0433* (2013.01); *B60S 1/08* (2013.01); *B62D 35/00* (2013.01); *B62D 35/007* (2013.01)

(58) Field of Classification Search
CPC ........ B60Q 1/2684; B60Q 1/30; B60Q 1/302; B60Q 1/44; B62D 35/00; B62D 35/007
USPC ................................. 296/96.17, 180.1–180.5
See application file for complete search history.

(56) References Cited

U.S. PATENT DOCUMENTS

| | | |
|---|---|---|
| 1,899,812 A | 2/1933 | Knapp |
| 1,923,342 A | 8/1933 | Ranst |
| 2,040,966 A | 5/1936 | Westrope |
| 5,504,966 A | 4/1996 | Lee et al. |
| 5,771,526 A | 6/1998 | Burton |
| 5,799,358 A | 9/1998 | Unverrich |
| 6,123,384 A | 9/2000 | Eustache et al. |
| 6,270,142 B1 | 8/2001 | Danielsen |
| 6,637,801 B1 | 10/2003 | Eustache et al. |
| 7,364,330 B2 | 4/2008 | Nahm et al. |
| 7,618,083 B2 | 11/2009 | Munenaga et al. |
| 7,895,703 B2 | 3/2011 | Ina et al. |
| 8,020,247 B2 | 9/2011 | Katou et al. |
| 8,327,495 B1 | 12/2012 | Martinez |
| 8,585,118 B2 | 11/2013 | Kileen |
| 8,764,092 B2 | 7/2014 | Webb et al. |
| 8,973,968 B2 | 3/2015 | Crane et al. |
| 2002/0086587 A1 | 7/2002 | Buchanan, Jr. |
| 2007/0076418 A1 | 4/2007 | Nahm et al. |
| 2007/0200389 A1 | 8/2007 | Ina et al. |
| 2008/0030047 A1 | 2/2008 | Munenaga et al. |

FOREIGN PATENT DOCUMENTS

| | | |
|---|---|---|
| DE | 10 2008 026131 | 12/2008 |
| FR | 2 796 915 | 2/2001 |
| JP | 2003506242 A | 2/2003 |
| JP | 2007253927 A | 10/2007 |
| JP | 2008062810 A | 3/2008 |
| JP | 2009067360 A | 4/2009 |
| JP | 2009196478 A | 9/2009 |

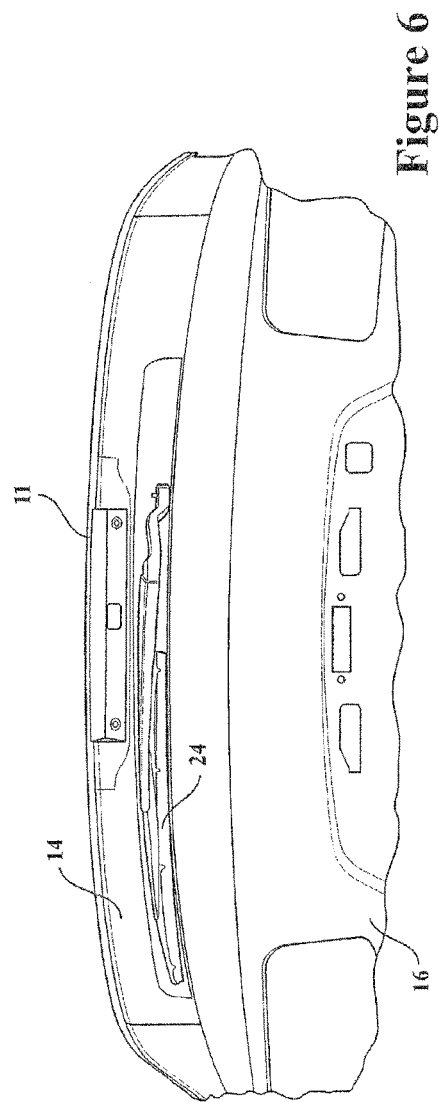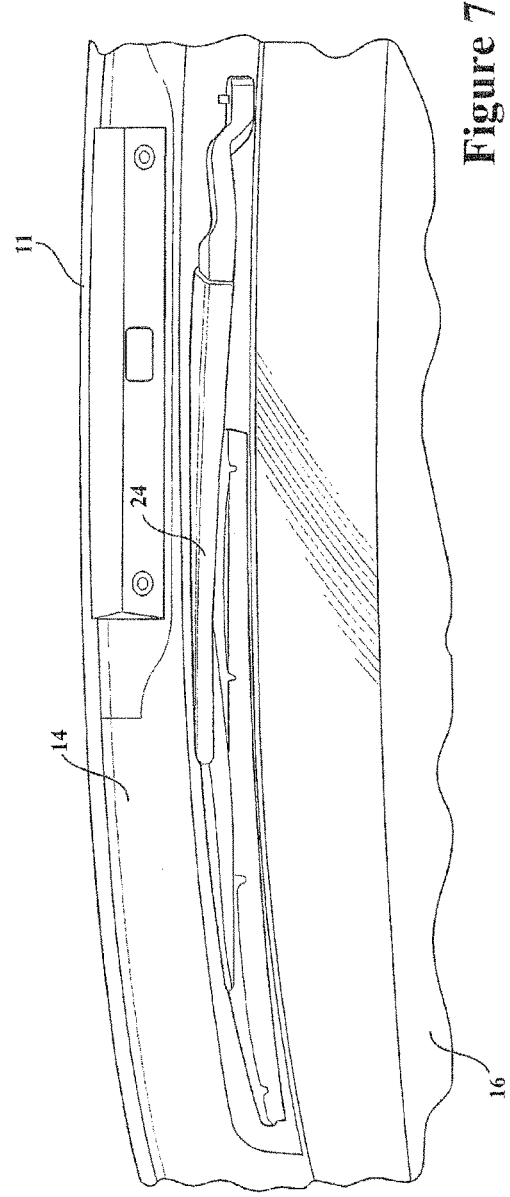

WINDSHIELD WIPER MODULE

CROSS-REFERENCE TO RELATED APPLICATION

This application is a Continuation Application of U.S. patent application Ser. No. 14/232,966, filed Jan. 15, 2014, which is the National Stage of International Application No. PCT/US2012/047612, filed Jul. 20, 2012 which claims the benefit of U.S. Provisional Application No. 61/572,831 filed July 22, 2011. The disclosures of the above applications are incorporated herein by reference.

FIELD OF THE INVENTION

The present invention relates to a wiper module assembly which is a separate component from a spoiler, liftgate, or other vehicle component, and is removable such that repairs to the wiper module assembly can be achieved without the disassembly or removal of the spoiler.

BACKGROUND OF THE INVENTION

Liftgates are commonly used on crossover vehicles and sport utility vehicles, instead of a trunk. These liftgates typically have a window, which serves as the rear window of the vehicle. Different designs and styling often incorporate the use of a spoiler mounted to the top of the liftgate, and more specifically, across the top of the window.

These liftgates also use some type of a windshield wiper which is mounted to the liftgate to clear the rear window during inclement weather conditions.

However, many design requirements of liftgates require that the windshield wiper be hidden from view to achieve the desired styling. Many attempts to achieve this have involved designing the liftgate to be made of multiple components, which must be removed when the windshield wiper needs to be serviced.

FIG. 1 is an exploded prior art view showing a conventional lift gate 100. The lift gate 100 is generally formed of metal where an inner metal panel 102 and outer metal panel 104 are crimped, bonded or welded together. In between the inner metal panel 102 and outer metal panel 104 there are several intermediate support brackets 106 that strengthen the inner metal panel and outer metal panel of the lift gate 100.

Attached to the inner metal panel 102 are a number of appliqués 108 that cover the inner metal panel 102 and make up the interior appearance of the lift gate 100. A window 110 is bonded to an aperture formed in the opening of the outer metal panel 104. The outer metal panel 104 is painted to achieve a class A surface that is viewed from the outside of the vehicle.

A separate rear spoiler 112 formed of metal or plastic is connected between the inner metal panel 102 and outer metal panel 104. The rear spoiler 112 houses a windshield wiper assembly 109 that functions to operate in connection with the window 110. The windshield wiper 109 is connected to the rear spoiler 112 and the motor (not shown) for the windshield wiper is placed on a carrier 107 that is held in place within the liftgate 100 between the inner panel 102 and outer panel 104. If the wiper assembly 109 or motor needs to be serviced, the entire liftgate 100 must be disassembled in order to disconnect the wiper assembly 109 or motor from the liftgate 100. In addition to servicing issues, the liftgate 100 is formed of several components that have to be assembled together in order to form the liftgate. It is desirable to reduce the number of components.

Accordingly, there exists a need for a liftgate which has a spoiler designed in such a manner that the windshield wiper may be serviced and removed without disassembling the spoiler.

SUMMARY OF THE INVENTION

The present invention is directed to a wiper module assembly for a vehicle liftgate having an inner panel with a spoiler formed as a one piece part of the inner panel. An outer panel of the liftgate is connected to the inner panel to form an exterior surface of the liftgate. A cavity is formed in part of the spoiler and receives a carrier forming a removable module connectable to the cavity of the vehicle liftgate. A motor is connected to the carrier and has a drive assembly driven by the motor. A spindle rotatably extends from and is driven by the drive assembly. A wiper is connected to the spindle and moves between a retracted position and an extended position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 6 an enlarged angled rear plan view of a liftgate having a wiper module assembly attached to a spoiler, according to the present invention;

FIG. 7 a greatly enlarged angled rear plan view of a liftgate having a wiper module assembly attached to a spoiler, according to the present invention;

DETAILED DESCRIPTION OF THE PREFERRED EMBODIMENTS

Figure 1:
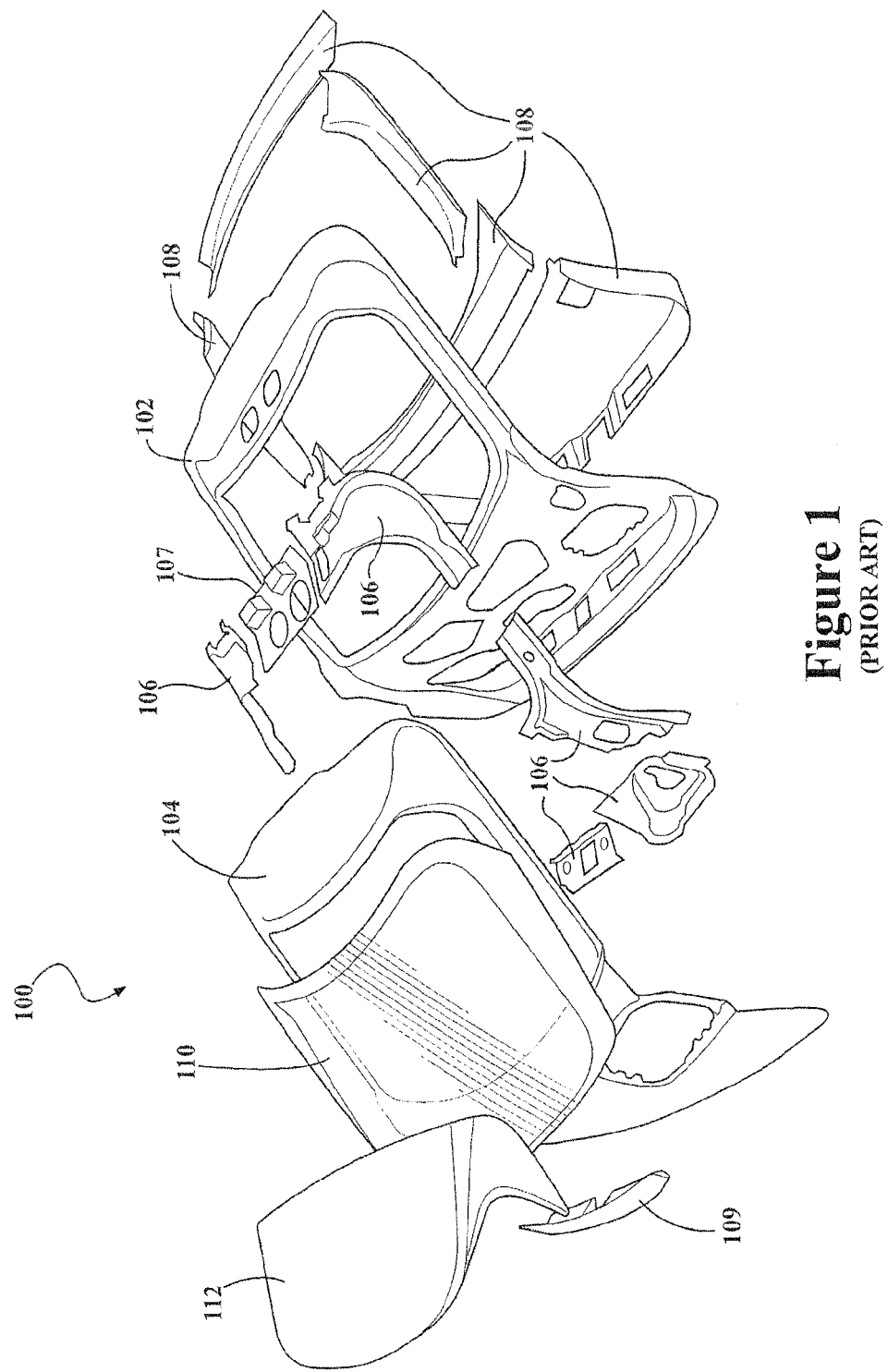
FIG. 1 is an exploded perspective view of a prior art lift gate.
Figure 2:
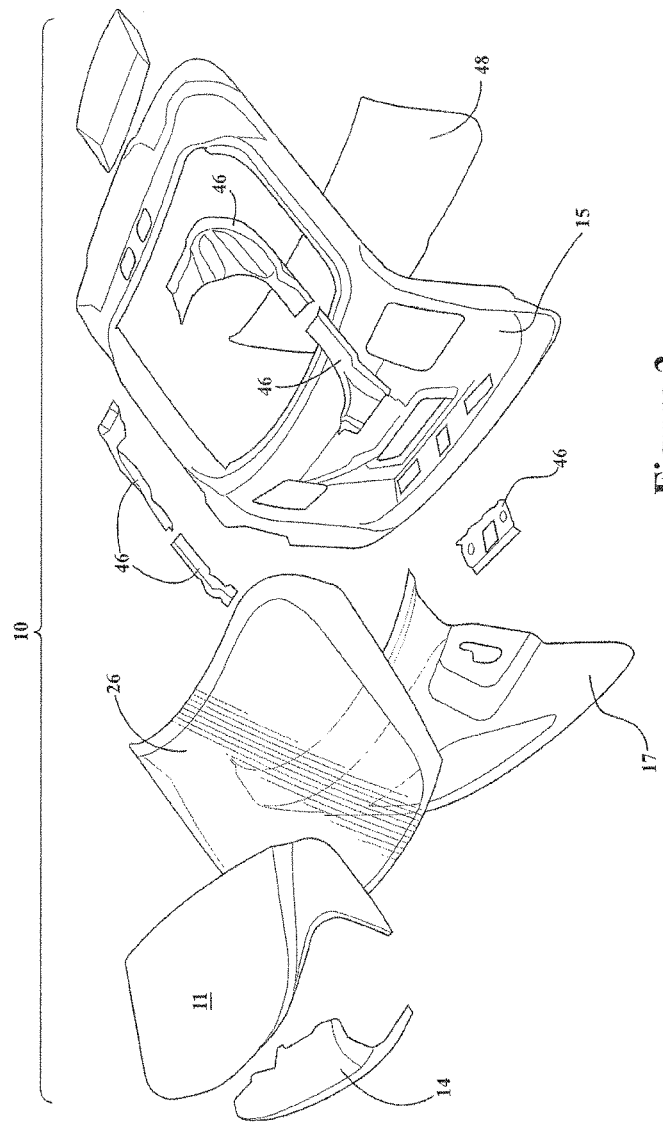
FIG. 2 is an exploded perspective view of a lift gate in accordance with one aspect of the present invention.
Figure 3:
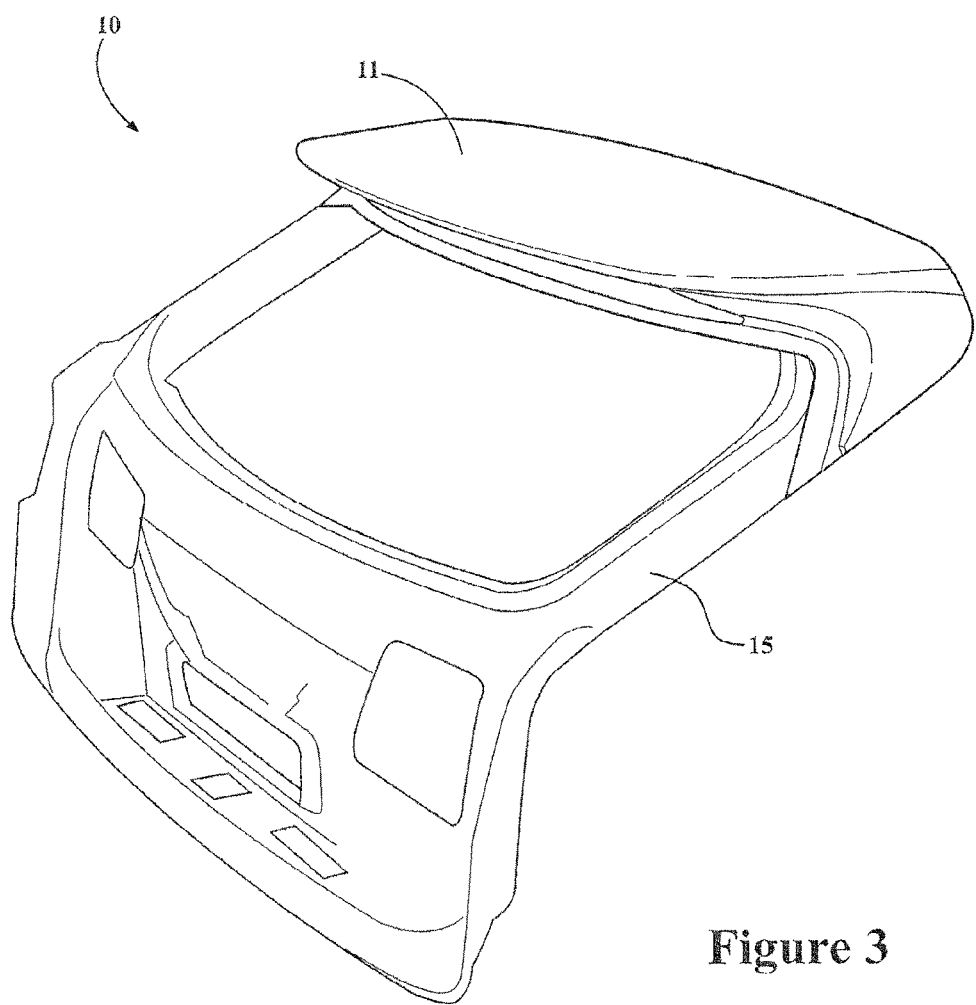
FIG. 3 is a perspective view of the inner panel of a lift gate in accordance with the present invention.
Figure 4:
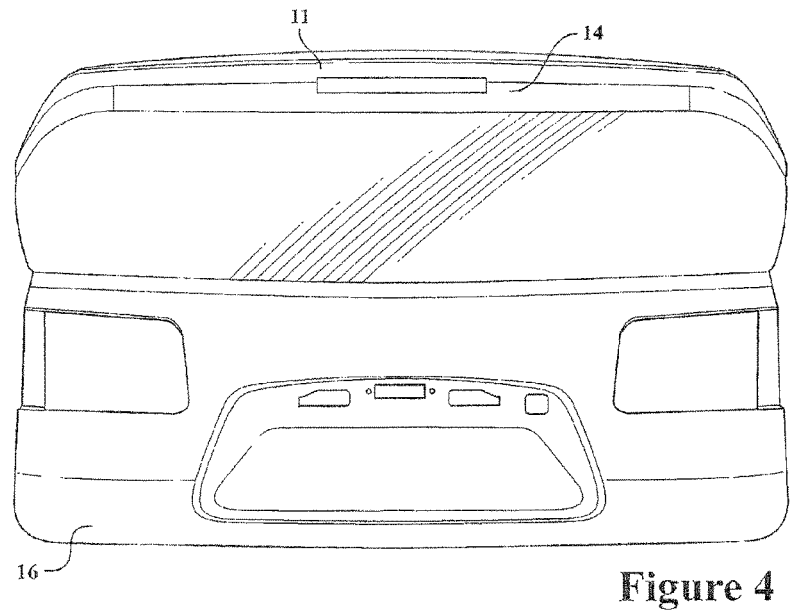
FIG. 4 is a rear plan view of a lift gate having a wiper module assembly attached to a spoiler in accordance with the present invention.
Figure 5:
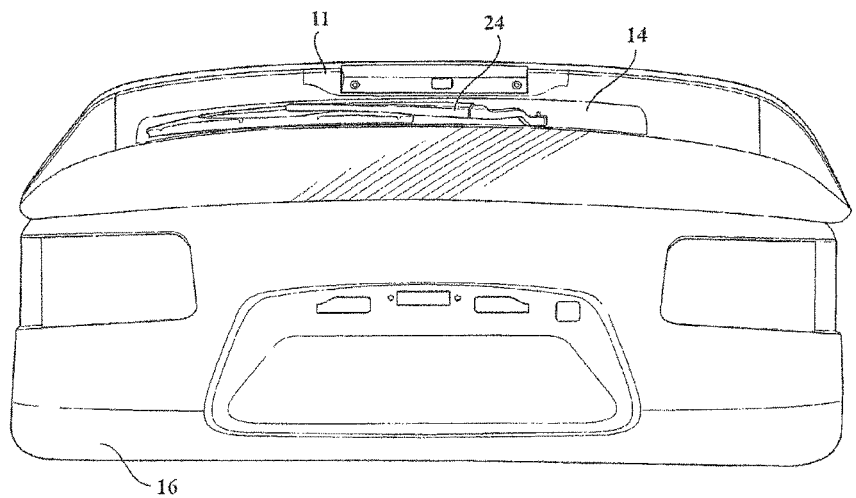
FIG. 5 is an angled rear plan view of a liftgate having a wiper module assembly attached to a spoiler, according to the present invention.
Figure 8:
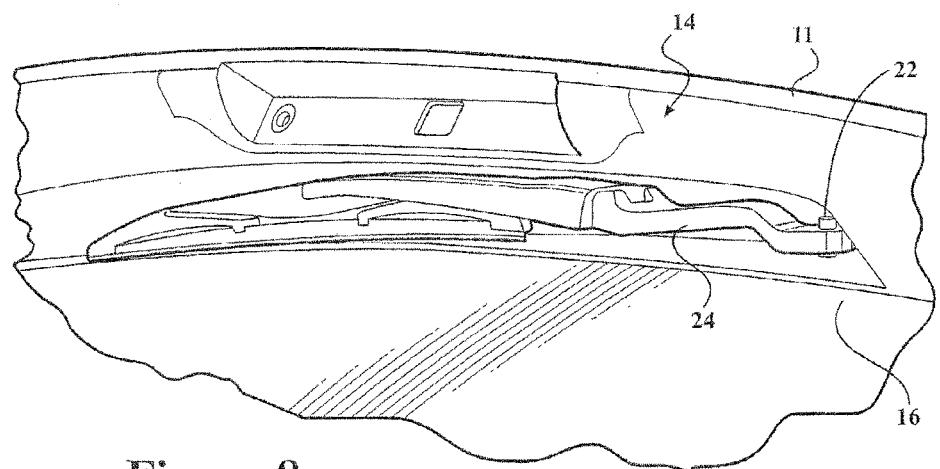
FIG. 8 is a second greatly enlarged angled plan view of a liftgate having a wiper module assembly attached to a spoiler, according to the present invention.
Figure 9:
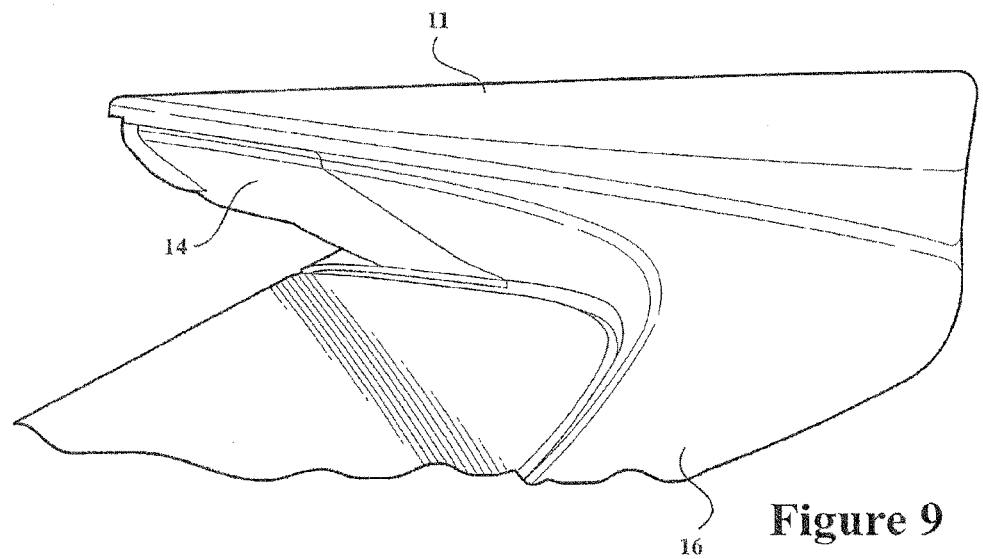
FIG. 9 is an enlarged side perspective view of a liftgate having a wiper module assembly attached to a spoiler, according to the present invention.
Figure 10:
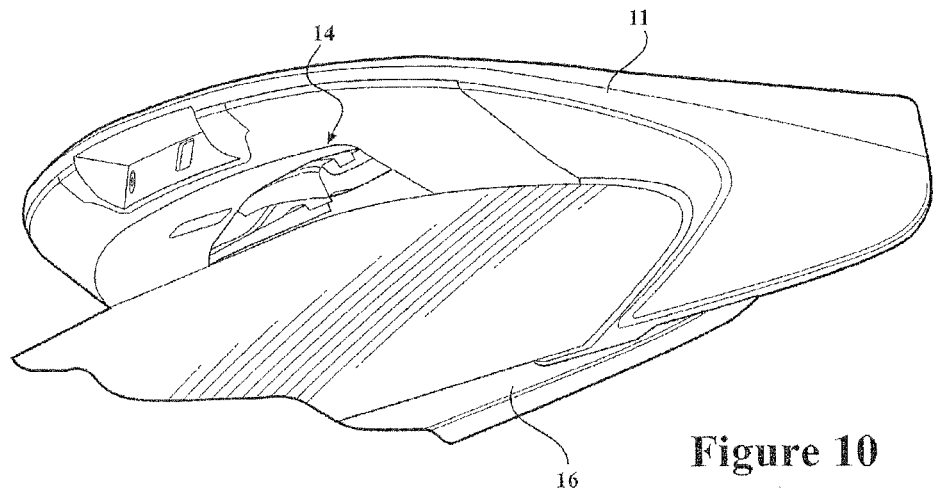
FIG. 10 a greatly enlarged side perspective view of a liftgate having a wiper module assembly attached to a spoiler, according to the present invention.
Figure 11:
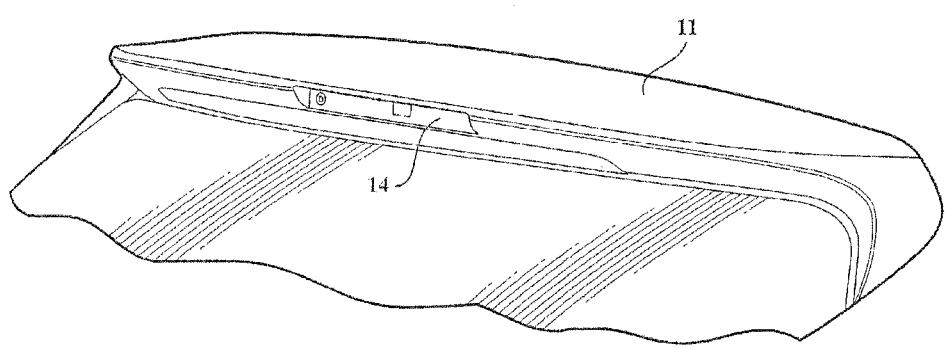
FIG. 11 is an enlarged perspective angled view of the lift gate with the wiper module assembly attached to the spoiler, according to the present invention.

The following description of the preferred embodiment(s) is merely exemplary in nature and is in no way intended to limit the invention, its application, or uses.

Referring to FIGS. 2-11 and 14-15, generally, a liftgate assembly 10 is generally shown. The liftgate assembly 10 in accordance with the present embodiment of the invention provides a wiper module assembly 14 connected to a spoiler 11, which is part of a liftgate 16 of the liftgate assembly 10 for a vehicle. The wiper module assembly 14 has a wiper 24 that operates to wipe a rear window 26 that is part of the liftgate assembly 10.

Figure 12:
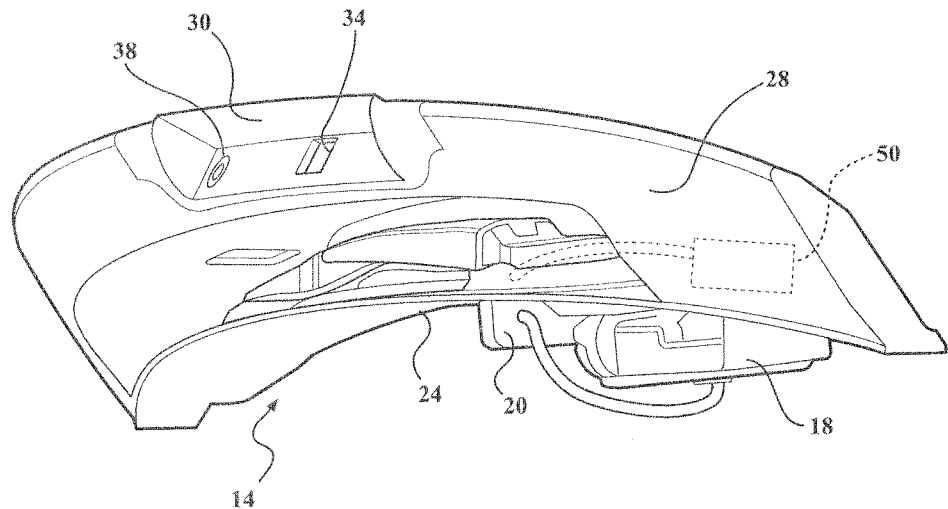
FIG. 12 is a side perspective view of the wiper module assembly.
Figure 13:
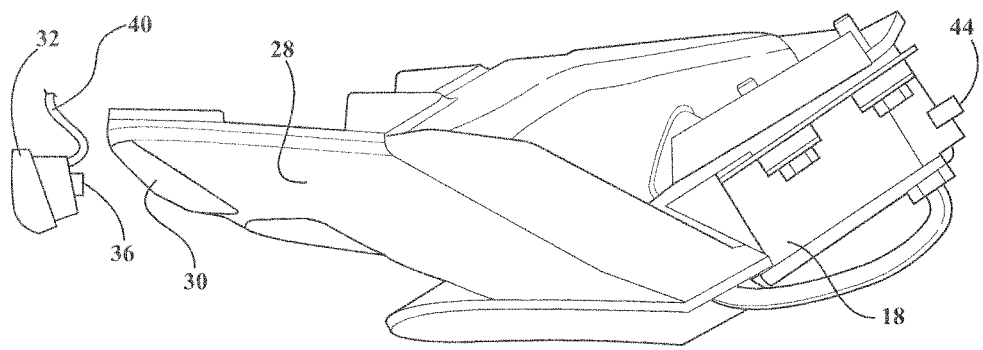
FIG. 13 is a side plan view of the wiper module assembly.
Figure 14:
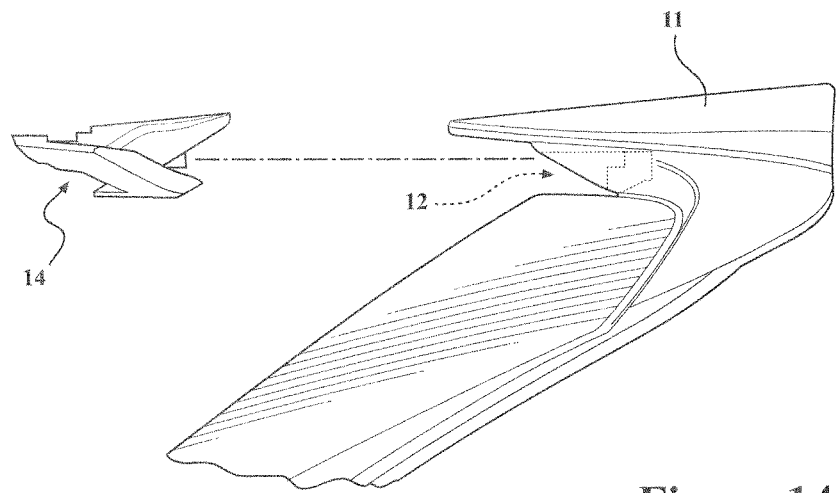
FIG. 14 is an enlarged exploded side plan view of the lift gate assembly having the wiper module assembly removed from the spoiler.
Figure 15:
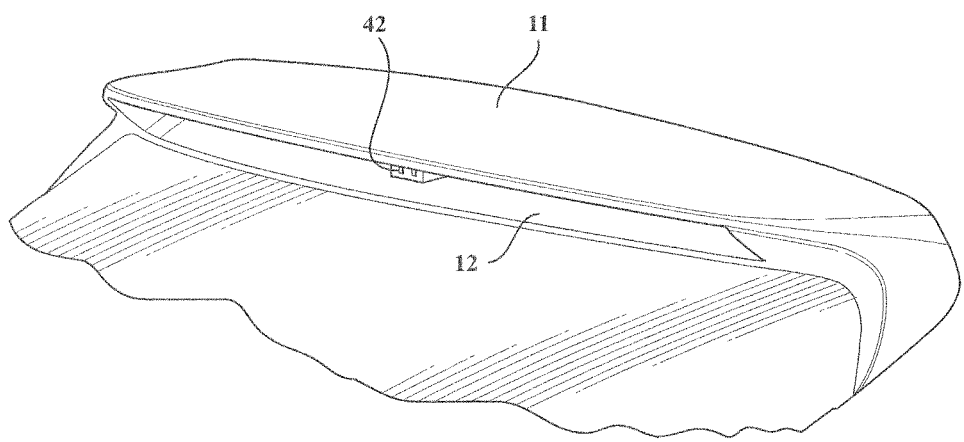
FIG. 15 is an enlarged side perspective view of the lift gate having the wiper module assembly removed.

The details of the wiper module assembly 14 are shown in FIGS. 12 and 13. The wiper module assembly 14 has a one-piece carrier 28 that is used as a mounting surface and is shaped to aesthetically fit into a cavity 12 of the spoiler 11 when connected to the liftgate 16. A wiper motor 18 is mounted to the carrier 28 and also has a drive assembly 20 that is connected to the motor 18. The drive assembly 20 can be a gear or gear train and the drive assembly 20 can be one piece with the wiper motor 18 or can be a separate component connected to the wiper motor 18. A spindle 22 for the wiper extends from the drive assembly 20 and connects to the wiper 24. When the wiper motor 18 is operated, the spindle 22 rotates between two or more positions so that the wiper 24 moves between a retracted position and extended position to wipe the rear window 26.

The spoiler 11 has the cavity 12 formed therein for receiving the wiper module assembly 14. The wiper module assembly 14 can be connected to the cavity 12 using fasteners, snap fits, adhesives, welding, or other suitable means. The cavity 12 has a wiper socket 44 that is configured to receive a wiper plug 42, which extends from the wiper motor 18. The wiper plug 42 and wiper socket 44 provide electrical power from the vehicle to the wiper motor 18. While the present embodiment of the invention describes a wiper plug and wiper socket, it is within the scope of this invention for the two components to be reversed or for some other suitable electrical connection to be made between the motor and the vehicle.

When the wiper module assembly 14 is positioned within the cavity 12, the carrier 28 of the wiper module assembly 14 is shaped to match the contours of the spoiler 11. It is within the scope of this invention for the cavity 12 to be in a different area and not necessarily within the spoiler 11, for example, the cavity can be formed in the liftgate panels. In other embodiments, the carrier 28 would have a different shape to match whatever shape is necessary in order to meet aesthetic design. In accordance with the present embodiment of the invention, the carrier 28 defines a removable module for connection to the cavity 12, wherein the carrier 28 is at least partially hidden from view by the liftgate 16 or the spoiler 11.

It is also within the scope of this invention for the wiper module assembly 14 to include other components. For example, one alternative embodiment of the invention includes a fluid pump 50 mounted to the carrier 28. The fluid pump 50 pump washer fluid that is sprayed either from the carrier 28 or the wiper 24 onto the rear window 26 of the liftgate 16.

Another aspect of the invention involves reducing the number of components and improving the design of the liftgate. In FIGS. 2-15 the liftgate 16 can be formed of metal or lightweight polymeric materials. In particular, the liftgate 16 has an inner panel 15 and an outer panel 17. The outer panel 17 is what is seen when the vehicle is viewed from the exterior. The inner panel 15 forms a frame from which the outer panel 17, rear window 26 and other components are attached. One aspect of the present invention has a molded inner panel 15 that is one piece with the spoiler 11 formed thereon. The prior art requires that the spoiler 112 be attached or welded between the inner panel 102 and outer panel 104. By providing a single piece molded spoiler 11 and inner panel 15, the number of components is reduced as well as possible problems that can occur due to water, snow or ice getting in between the inner panel 102 and the spoiler 112, which can damage the wiper module assembly 109.

The liftgate 16 in the present invention also includes a number of support brackets 46 positioned between the outer panel 17 and inner panel 15 which strengthen the liftgate 16. It is also within the scope of the invention for the outer panel 17 to be formed of a molded polymeric material, which reduces the overall weight of the liftgate 16, which have traditionally been formed of metal sheets and can be very heavy and cumbersome to move. The inner panel 15 also has attached an interior applique 48 which completes the interior surface of the liftgate 16.

In another embodiment of the invention, the wiper module assembly 14 includes a center high mount stop lamp (CHMSL) 32 that connects to a recess 30 formed on the carrier 28 of the wiper module assembly 14. The recess 30 has a lock aperture 34 that is configured to receive a tab 36 extending from the CHMSL 32. The lock aperture 34 and tab 36 function to provide a snap fit or locking tab arrangement for the CHMSL 32 into the recess 30 of the wiper module assembly 14. While a lock tab arrangement is described, it is within the scope of this invention for a different type of connection to be utilized, such as fasteners, adhesives or welding. In order to provide power to the CHMSL 32, a connector 38 is formed in the recess 30 and aligns with and receives a plug 40 extending from the CHMSL 32.

The design of the wiper module assembly 14 provides a removable or serviceable module that eliminates the need for disassembling the entire spoiler 11 from the liftgate 16. Additionally, the present invention reduces the number of components by providing a spoiler 11 that is formed of a one piece component with the inner panel 15. Additionally, the wiper module assembly 14, in alternative embodiments of the invention can include components in addition to the wiper 24 itself. For example, alternate embodiments of the wiper module assembly 14 include a fluid pump 50 for spraying fluid onto the rear window 26 and/or a CHMSL 32 unit that connects directly to the wiper module assembly 14, thus eliminating the need to have the CHMSL connected to a different part of the vehicle that would require more difficult disassembly in order to service the CHMSL.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wiper module assembly for a vehicle liftgate comprising:
a vehicle liftgate;
a spoiler attached to the vehicle liftgate, wherein the spoiler has surface contours;
a cavity formed as part of said spoiler;
a carrier defining a removable module for connection to the cavity, wherein the carrier is shaped to match the surface contours of the spoiler and the carrier is removable from the cavity;
a motor connected to said carrier and having a drive assembly driven by the motor;
a spindle rotatably extending from and driven by the drive assembly;
a wiper connected to the spindle and configured to move between a retracted position and an extended position;
a recess formed in the carrier, said recess having a lock aperture and a connector; and
a center high mount stop lamp that connects to the recess of the carrier and has a tab configured to slide into and connect the center high mount stop lamp to the lock aperture of the carrier and a plug configured to slide into the connector and electrically connect the center high mount stop lamp to the carrier.

2. The wiper module assembly for a vehicle liftgate of claim 1 wherein said carrier is a one-piece component.

3. The wiper module assembly for a vehicle liftgate of claim 1 wherein said carrier is at least partially hidden from view by said liftgate when said carrier is located in said cavity.

4. The wiper module assembly for a vehicle liftgate of claim 1, wherein said cavity further comprises a wiper socket and said motor has a wiper plug for connecting to said wiper socket in order to provide power to said motor.

5. The wiper module assembly for a vehicle liftgate of claim 1, said liftgate further comprising an inner panel connected to said spoiler and an outer panel connected to said inner panel.

6. A wiper module assembly for a vehicle liftgate comprising:
a vehicle liftgate;
a spoiler attached to the vehicle liftgate, wherein the spoiler has surface contours;
a cavity formed as part of one of one selected from group comprising a liftgate or spoiler;
a carrier defining a removable module for connection to the cavity, wherein the carrier is at least partially hidden from view by the liftgate or the spoiler when the carrier is located in the cavity and the carrier is shaped to match the surface contours of the spoiler and the carrier is removable from the cavity;
a motor connected to said carrier and having a drive assembly driven by the motor;
a spindle rotatably extending from and driven by the drive assembly;
a wiper connected to the spindle and configured to move between a retracted position and an extended position;
a recess formed in the carrier, said recess having a lock aperture and a connector; and
a center high mount stop lamp that connects to the recess of the carrier and has a tab configured to slide into and connect the center high mount stop lamp to the lock aperture of the carrier and a plug configured to slide into the connector and electrically connect the center high mount stop lamp to the carrier.

7. The wiper module assembly for a vehicle liftgate of claim 6 wherein said carrier is a one-piece component.

8. The wiper module assembly for a vehicle liftgate of claim 6 further comprising:
an inner panel of said liftgate and an outer panel of said liftgate, wherein said outer panel is connected to said inner panel.

9. The wiper module assembly for a vehicle liftgate of claim 6 wherein said cavity further comprises a wiper socket and said motor has a wiper plug for connecting to said wiper socket in order to provide power to said motor, when said carrier is positioned in said cavity.

* * * * *